United States Patent
Palmieri et al.

(10) Patent No.: US 9,978,181 B2
(45) Date of Patent: May 22, 2018

(54) SYSTEM FOR VIRTUAL REALITY DISPLAY

(71) Applicant: Ubisoft Entertainment, Rennes (FR)

(72) Inventors: Olivier Palmieri, Montreal (CA); Félix Roy, Montreal (CA)

(73) Assignee: Ubisoft Entertainment, Rennes (FR)

(*) Notice: Subject to any disclaimer, the term of this patent is extended or adjusted under 35 U.S.C. 154(b) by 49 days.

(21) Appl. No.: 15/164,295

(22) Filed: May 25, 2016

(65) Prior Publication Data

US 2017/0345212 A1 Nov. 30, 2017

(51) Int. Cl.
| | |
|---|---|
| *G09G 5/00* | (2006.01) |
| *G06T 19/00* | (2011.01) |
| *G06T 7/20* | (2017.01) |
| *G06F 3/01* | (2006.01) |
| *G06T 7/00* | (2017.01) |
| *G06T 13/40* | (2011.01) |
| *G02B 27/01* | (2006.01) |

(52) U.S. Cl.
CPC ........ *G06T 19/006* (2013.01); *G02B 27/0172* (2013.01); *G06F 3/012* (2013.01); *G06T 7/0085* (2013.01); *G06T 7/20* (2013.01); *G06T 13/40* (2013.01); *G02B 2027/014* (2013.01); *G02B 2027/0134* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 6,222,174 B1* | 4/2001 | Tullis | G06K 9/228 250/208.1 |
| 2009/0232202 A1* | 9/2009 | Chen | H04N 21/234327 375/240.02 |
| 2014/0268356 A1* | 9/2014 | Bolas | G02B 27/0093 359/630 |
| 2016/0026253 A1* | 1/2016 | Bradski | G02B 27/225 345/8 |
| 2016/0100676 A1* | 4/2016 | Sandanger | A45F 5/00 224/181 |

(Continued)

OTHER PUBLICATIONS

Ajoy et al., "Combating VR Sickness through Subtle Dynamic Field-Of-View Modifcation", Mar. 2016, IEEE, URL: http://ieeexplore.ieee.org/stamp/stamp.jsp?arnumber=7460053.*

(Continued)

*Primary Examiner* — David H Chu
(74) *Attorney, Agent, or Firm* — Erise IP, P.A.

(57) ABSTRACT

Systems and method for selectively applying blinders to remove high peripheral optical flow from three-dimensional imagery. When users experience visual cues corresponding to motion in virtual reality without corresponding non-visual clues (such as cues from the vestibular system), motion sickness can result. Peripheral optic flow is a particularly strong visual cue associated with motion. However, unconditionally removing peripheral imagery significantly reduces user immersion. Embodiments of the invention can selectively apply peripheral blinders to remove high peripheral optic flow and add non-visual motion cues (such as directional audio) corresponding to the virtual motion to reduce or eliminate the disconnect that can cause motion sickness.

20 Claims, 4 Drawing Sheets

(56) References Cited

U.S. PATENT DOCUMENTS

2017/0186237 A1* 6/2017 Hirota .................. G06T 7/20
2017/0221180 A1* 8/2017 Nakashima ............ G06F 3/14
2017/0221185 A1* 8/2017 Inomata ................ G06T 5/002

OTHER PUBLICATIONS ifixit.com, "Oculus Rift CV1 Teardown", Mar. 30, 2016, ifixit.com, URL: https://web.archive.org/web/20160330201450/https://www.ifixit.com/Teardown/Oculus+Rift+CV1+Teardown/60612.*

ESPN NFL Football, "Espn Nfl Football. First Person Football!", ESPN, URL: https://www.youtube.com/watch?v=RZkQUWRd64g.*

Fernandes, Ajoy S., et al; "Combating VR Sickness Through Subtle Dynamic Field-Of-View Modification," IEEE Symposium on 3D User Interfaces, Greenville, SC, pp. 201-210, Mar. 19-23, 2016.

"Fighting Virtual Reality Sickness," Columbia University In The City of New York, Columbia Engineering, The Fu Foundation School of Engineering and Applied Science, posted at http://enginerering.columbia.edu.fighting-virtual-reality-sickness, Jun. 14, 2016.

* cited by examiner

SYSTEM FOR VIRTUAL REALITY DISPLAY

BACKGROUND

1. Field

Embodiments of the invention generally relate to three-dimensional virtual reality displays and, more particularly, to an improved system for virtual-reality display using selective blindering to reduce the occurrence of motion sickness in users.

2. Related Art

Traditionally, head-mounted, three-dimensional displays are associated with significant kinetosis (also known as motion sickness) in users. This is a result of a disconnect between visual clues (e.g., visually perceived motion) and non-visual cues (e.g., the vestibular system's sense of movement). In susceptible users, kinetosis may render immersive three-dimensional displays completely unusable. As such, there is a need for a three-dimensional display system that can reduce kinetosis, either by removing problematic visual cues or by providing additional non-visual cues that agree with the visual cues.

SUMMARY

Embodiments of the invention address the above-described problem by providing a system that can remove problematic visual cues via selective blindering and add additional audio cues consistent with visual motion cues. In particular, in a first embodiment, the invention includes a system for virtual reality, comprising a head-mounted three-dimensional display wearable by a user, a processor; and one or more computer-readable storage media storing computer-executable instructions which, when executed by the processor, perform a method of generating images for display on the head-mounted, three-dimensional display, comprising the steps of generating a series of base images of three-dimensional imagery, measuring relative movement of a virtual object in the series of base images, determining, based on the relative movement of the virtual object, that the series of base images includes a high degree of peripheral optic flow, applying a blinder to a side of the series of base images associated with the high degree of peripheral optic flow to obtain a series of blindered images, and displaying the series of blindered images on the head-mounted, three-dimensional display.

In a second embodiment, the invention includes a virtual-reality display for mounting on a head of a user, comprising a first display configured to be positioned in front of a left eye of the user, a second display, configured to be mounted in front of a right eye of the user, a plurality of speakers, configured to provide stereo sound to the user, one or more sensors configured to track an orientation for the head of the user, a processor, and one or more computer-readable media storing computer-executable instructions that, when executed by the processor, perform a method of dynamically applying blinders to virtual-reality imagery comprising the steps of receiving, from the one or more sensors, an indication of a rotation of the head of the user to a new orientation updating a left eyepoint and a right eyepoint in a virtual scene to correspond to the new orientation, wherein the left eyepoint and the right eyepoint are updated in real time with no inertia, determining that, as a result of updating the eyepoint, the virtual scene includes high peripheral optic flow at a border, and applying blinders to the border of the virtual-reality imagery on the first display and the second display to reduce the high peripheral optic flow.

In a third embodiment, the invention includes a method of dynamically applying blinders to a three-dimensional image, comprising the steps of receiving a series of base images of three-dimensional imagery, measuring relative movement of a virtual object in the series of base images, determining, based on the relative movement of the virtual object, that the series of base images includes a high degree of peripheral optic flow associated with a side of the series of base images, applying a blinder to the side of the series of base images associated with the high degree of peripheral optic flow to obtain a series of blindered images, and displaying the series of blindered images on a display mounted on a head of a user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
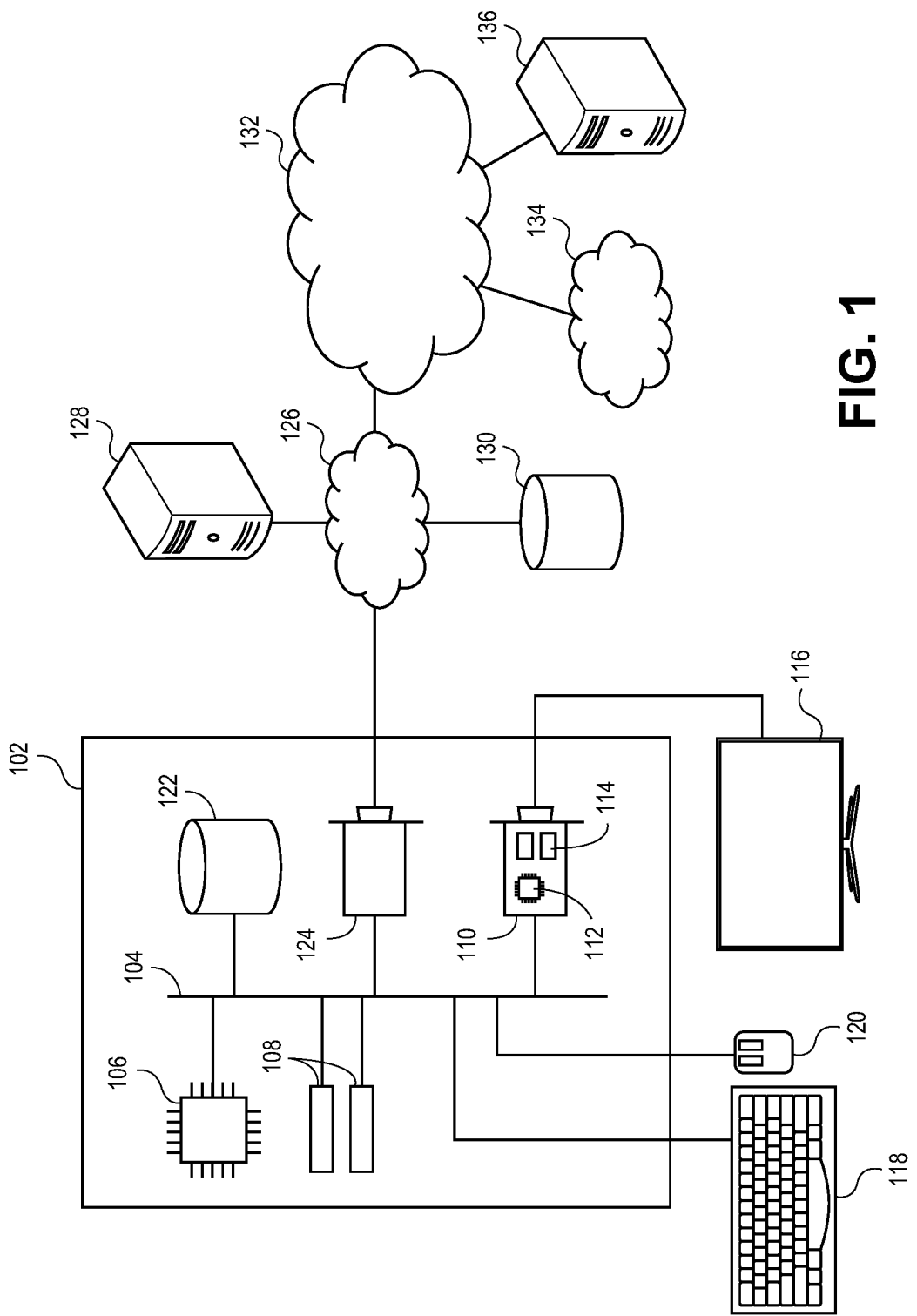
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention address the disconnect between visual cues indicating motion and non-visual cues indicating a lack of motion, thereby reducing the incidence of kinetosis. In particular, embodiments of the invention can both add audio cues corresponding to motion in the virtual scene and remove problematic peripheral visual cues using selective blinders. When the user is moving parallel to a large object such as a wall or rotating near an object, the relative motion creates a high degree of optic flow indicating rapid movement to the user. When this motion is not confirmed by non-visual cues (for example, from the user's vestibular system), kinetosis can result.

Removing or reducing the visual cues associated with this motion can be done by selectively applying a blinder to (or "blindering") a border of the display where the motion is taking place. A blinder is an opaque or semi-opaque region placed at the periphery of an image to be displayed on the three-dimensional display. If applied permanently, binders can reduce the user's immersion, but when applied only when problematic visual cues are present, blinders can reduce problematic peripheral visual cues without breaking the user's immersion. Similarly, directional audio cues can be played over speakers or earbuds to substantiate visual movement cues.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Operational Environments for the Invention

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
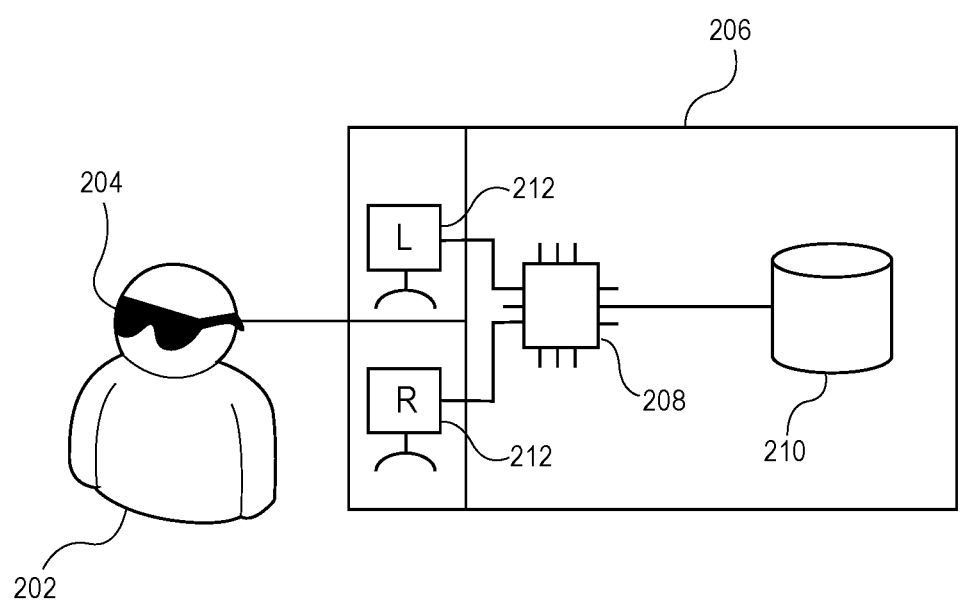
FIG. 2 depicts a second exemplary platform suitable for practicing embodiments of the invention.

Turning now to FIG. 2, a second exemplary platform suitable for practicing embodiments of the invention is depicted. In particular, FIG. 2 depicts user 202 wearing head-mounted display 204. Head-mounted displays can offer unparalleled immersion for virtual reality, augmented reality, and other applications. However, a significant fraction of users of head-mounted displays experience kinetosis (also known as motion sickness) when using immersive head-mounted displays due to the disagreement between visually perceived motion and the vestibular system's sense of movement. A key realization to solving this problem is that forward movement does not generally result in such a disagreement, but only rotational or lateral movement. As such, obscuring the peripheral vision can reduce the occurrence of kinetosis by reducing the visual perception of lateral (e.g., moving quickly past an object) and rotational motion (e.g., the user's viewpoint rotating close to an object). However, removing all visual information from the peripheral areas of the user's vision gives a tunnel-vision-like experience, reducing immersion and adversely impacting user experience. As discussed in detail below, it is one goal of the invention to avoid kinetosis while maintaining user immersion by selectively apply peripheral blinders to remove perceived rotational and lateral optic flow.

In some embodiments, the head-mounted display may also include stereo speakers (such as, for example, headphones or earbuds) to provide the user with audio corresponding to the virtual reality display. In some embodiments, audio cues corresponding to the movement of the user's virtual avatar in the virtual scene can be added to the base audio corresponding to the virtual scene, as discussed in further detail below. By using stereo speakers, these cues as well as the base audio can be made appropriately directional.

In some embodiments, the head mounted display may also include one or more head trackers so that the motion of the user's head can be monitored and the view displayed in head-mounted display 204 can be updated accordingly. Thus, for example, if the user rotates their head to look left, the viewpoint of the virtual reality would also rotate left. A variety of head tracking technologies can be employed for this purpose, including accelerometer-based systems, gyroscope-based systems, and camera-based systems. In some embodiments, the system respects the orientation of the player's head absolutely, and updates the orientation of the viewpoint without inertia or acceleration, even where the motions of the user's avatar are otherwise constrained.

Head-mounted display 204 operates with virtual reality system 206. In some embodiments, virtual reality system 206 in integrated into head-mounted display 204. In other embodiments, virtual reality system 206 is communicatively coupled to head-mounted display 204 via a wired or wireless connection. Broadly speaking, system 206 may include all of the components of computer 102. Depicted are processor 208, data store 210, and displays 212. Data store 210 may store computer-executable instructions for execution by processor 208 to generate imagery for display on displays 212. In some embodiments, the system may also include other components of computer 102, such as one or more GPUs, RAM, one or more network or communications interfaces, and input/output devices. In some embodiments, displays 212 may be integrated into head-mounted display 204. In other embodiments, the displays 212 may be fixed, such as (for example) a single screen displaying both sets of imagery via alternating polarization or autostereoscopy. In some embodiments, the system may include further components not present in computer 102, such as external sensors or reference points used for motion tracking the user as they move in the physical world.

Operation of Embodiments of the Invention

Figure 3:
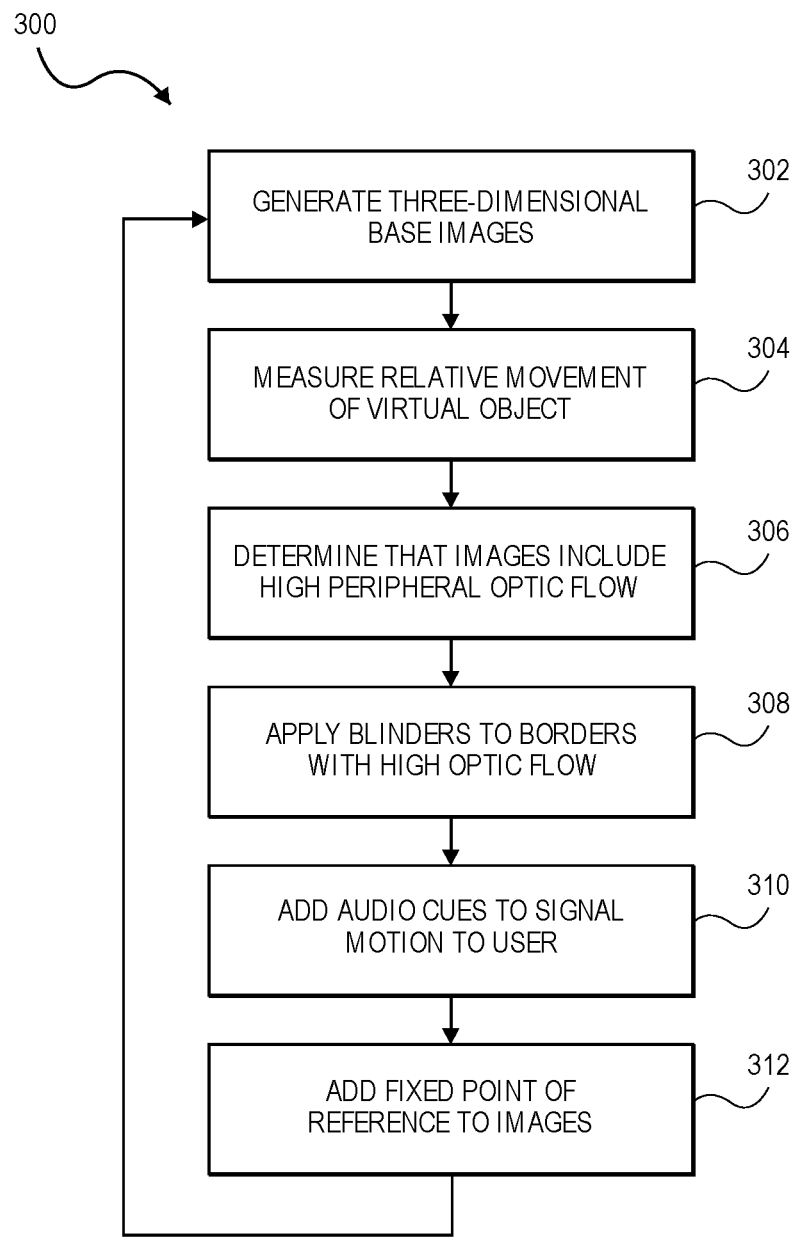
FIG. 3 depicts a flowchart illustrating the operation of a method in accordance with embodiments of the invention.

Turning now to FIG. 3, a flowchart depicting the operation of a method in accordance with embodiments of the invention is depicted and referred to generally by reference numeral 300. Initially, at step 302, a series of three-dimensional base images are generated. Broadly, each three-dimensional image comprises pair of stereoscopic, two-dimensional images: one for each of the left eye and the right eye that, when viewed together, produce the illusion of depth. By displaying a series of three-dimensional imagery at a sufficiently high frame rate (e.g., 24 or 60 frames per second), the illusion of motion can be produced as well. In order to generate convincing three-dimensional imagery, a virtual representation of a scene to be displayed can be generated (typically by a GPU such as GPU 112), and then captured from two perspectives (i.e., virtual eyepoints) spaced approximately the same as a viewer's eyes. A variety of techniques and combinations of techniques can be used for generating three-dimensional base images in real time, such as raycasting or rasterization with radiosity. Together with the base imagery, a base audio track can also be generated based on diegetic or non-diegetic sounds and music.

This virtual scene may comprise one or more virtual objects superimposed on a background (also known as a skybox) and the objects may move with respect to each other and the background from frame to frame, or with respect to the user's virtual avatar. This virtual scene can also be used for other purposes, such as modeling the spatial relationships, physics and collisions between the virtual objects, or between the virtual objects and the user's virtual avatar. If displayed directly on a virtual-reality display such as head-mounted display 204, the three-dimensional base images can provide a realistic and immersive three-dimensional experience for the user. However, as discussed above, a realistic three-dimensional experience can result in kinetosis and nausea in a significant proportion of users. In some embodiments, the virtual scene itself may be generated in such a way as to reduce apparent optic flow. For example, a darker visual world may present less apparent optical flow to a user than a bright one. Similarly, the virtual scene may include only limited texture details to likewise limit the optic flow experienced by the user.

Next, at step 304, the system measures the movement of one or more virtual objects with respect to the user. Because the optic flow associated with kinetosis is related to angular velocity, nearby objects contribute more than distant ones. As such, in some embodiments, only nearby objects (for example, objects within 50 m of the user's virtual avatar) may be considered for the purposes of optic flow detection.

In particular, in some embodiments of the system, nearby objects are detected using collision detection with an extended body of the user. In some such embodiments, a virtual sphere can be created centered on the user and any object that collides with that sphere is determined to be nearby and examined for contributions to optic flow. In other embodiments, the physics engine associated with the virtual scene can be used to directly calculate distances between objects and the user's viewpoint. In still other embodiments, a down-sampled depth texture generated by the GPU can be used to determine regions nearby that contain a nearby object without detecting the objects directly.

Once nearby objects have been identified, their velocity relative to the user can be determined. Motion relative to the user can be caused by motion of the object or by motion of the user. In particular, the user rotating their viewing perspective (for example, by turning their head) can cause high angular velocity relative to the user without any absolute relative velocity. Because lateral and rotational movement contributes significantly more to kinetosis than does forward movement, angular velocity may be used in some embodiments rather than absolute velocity. In some embodiments, the exact velocity may not be calculated, but instead it may be determined simply that the object has a high velocity.

Once the one or more objects have been processed, the method continues to step 306, where the peripheral optic flow associated with the imagery is determined. In particular, objects with high angular velocity that appear close to a border of the image (i.e., the top, bottom, left or right side of the image) contribute to the optic flow for that border. In some embodiments, the average angular velocity for nearby objects close to each border may be calculated as the optic flow for that border. In other embodiments, the optic flow for a border may be calculated based on the object with the highest angular velocity. In some embodiments, the optic flow for each border is time smoothed (using, for example, a moving average or weighted moving average) to prevent blinder flapping. In some embodiments, once the optic flow for each border is calculated, it is compared to a threshold to determine whether each border has high optic flow.

Processing then proceeds to step 308, where blinders are applied to the borders with high peripheral optic flow. In some embodiments, blinders are opaque overlays applied to the border of the base image to obscure the regions of high peripheral optic flow and reduce kinetosis. In other embodiments, the blinders are semi-transparent, or fade from opacity at the border to transparency at the interior border of the blinder. These blinders can be removed once the high optic flow ends, to restore the peripheral imagery to the user's field of view. In some embodiments, interior boundaries of the blinders (i.e., the sides of the boundaries adjacent to the imagery) are parabolic in shape to resemble a physical object blocking a portion of the user's vision. In some such embodiments, the size of the blinder may reflect the distance between the border and one or more objects with high angular velocity. In other such embodiments, the borders may be of fixed size. In some embodiments, the border of the blinder is noised or otherwise de-smoothed to provide a less artificial border. This noise may be animated or otherwise change from frame to frame. Borders may be applied to one border, multiple borders, or no borders of the series of images to produce a set of blindered images.

In some embodiments, processing then proceeds to step 310 where audio cues are added to the audio for the virtual reality display to provide non-visual movement cues to the user. For example, high-velocity nearby objects (which are likely to cause high optic flow) may cause increasing directional turbulence noise as they approach. By reducing the disconnect between visual and non-visual cues, such audio signals can further reduce the occurrence of kinetosis. Similarly, when the user's virtual avatar is turning, more noise in one ear (such as the outside ear of the turn) can provide a non-visual cue corresponding to the visual display.

In some embodiments, processing then proceeds to step 312, where a fixed point of reference is added to the series of blindered images. This fixed point of reference does not move with the rest of the virtual scene, but rather remains fixed with respect to the player's frame of reference. For example, a representation of the player's nose, eyebrows, glasses, or hands can be added to the blindered images to provide the user with a sense of physicality, and still further reduce the occurrence of kinetosis.

Finally, at step 312, the system displays the blindered images to the user. In some embodiments, the blindered images are displayed unconditionally. In other embodiments, where optic flow could not be sufficiently reduced using blinders, a blank (or otherwise free of motion cues) image can be displayed instead of the high-optic flow images. For example, if the user experiences a sudden deceleration (such as a crash) in the virtual scene, this high change of velocity with respect to the other objects in the scene can create high optic flow across the entire three-dimensional image. In such scenarios, the system may blank the screen to avoid inducing kinetosis in the user.

Figure 4:
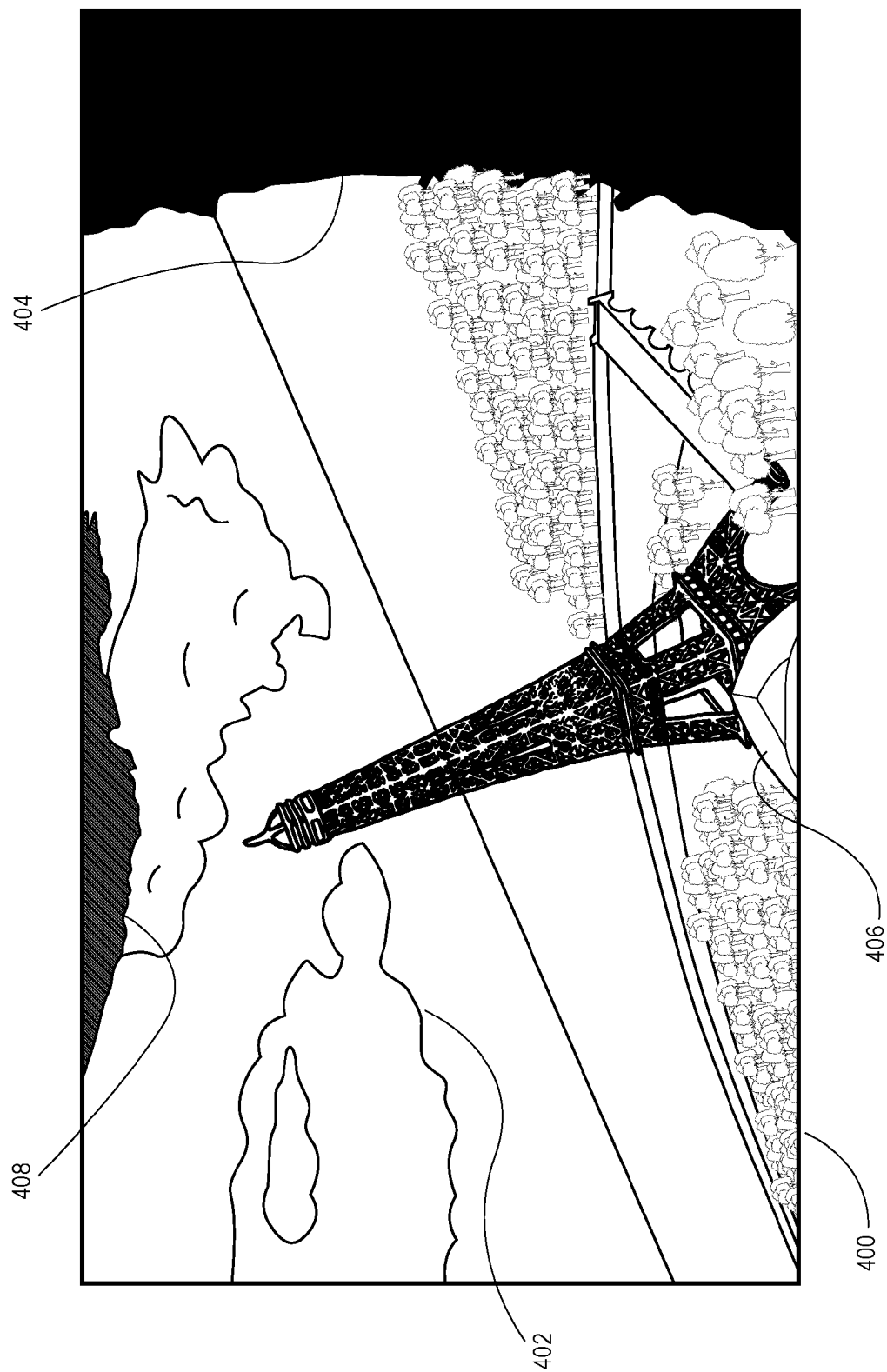
FIG. 4 depicts an exemplary blindered image from a virtual scene.

Turning now to FIG. 4, an exemplary blindered image from a virtual scene is depicted and referred to generally by reference numeral 400. Blindered image 400 is generated based on base image 402. Although FIG. 4 depicts only a right-eye view, both blindered image 400 and base image 402 comprise both a right-eye view and a left-eye view captured from distinct eyepoints in the virtual scene. By spacing these eyepoints similarly to the spacing of the user's eyes, the illusion of depth can be produced. Generating and capturing base image 402 can be done by any 3D rendering technique now known or later developed including rasterization, scanline rendering, raytracing, raycasting, and/or radiosity.

After base image 402 has been generated, blinders 404 can be applied if necessary. In some embodiments, previous frames of base images are saved to be compared against the current frame to detect motion. In other embodiments, motion detection is done based on the virtual representation of objects in the virtual scene prior to rendering. As discussed above, in some embodiments only objects within a certain distance of the user's virtual avatar are checked to determine relative motion. When excessive optic flow is detected at a border of the image, a blinder can be applied to that side. In some embodiments, blinders are animated in, growing from the border of the imagery each frame until the desired level of occlusion is reached. In other embodiments, blinders are fully applied as soon as optic flow exceeds a threshold.

As can be seen in FIG. 4, the edges of blinders 404 can be noised to reduce the artificiality of their appearance and more closely resemble the natural fading of the user's peripheral vision. In some embodiments, this noise is animated and changes from frame to frame. As depicted, only a single blinder is present in blindered image 400. This may be the case when a single nearby object or wall moving with respect to the user causes the high optic flow, or when the user's viewpoint is rotating. In other cases, multiple blinders might be applied to the same image. For example, if the user's virtual avatar is moving down a street with tall buildings on either side, left and right blinders might be applied to reduce the apparent optic flow.

In addition to the blinders, fixed reference points 406 and 408 have been added to base image 402 to increase the apparent physicality of the user's virtual avatar. In particular, in blindered image 400, the user's avatar is an eagle, so a beak has been added as fixed reference point 406 and eyebrows have been added as fixed reference point 408. Other objects that would remain fixed with respect to a user can also be used as fixed reference points, including glasses, hands, a hat or helmet, or heads-up display. In some embodiments, these fixed reference points are static, while in others, they are dynamic, and might enter the virtual scene, move, and then leave the virtual scene. For example, a user's hands might be present in the scene, leave the scene to pick up and object, and then re-enter the scene. Even if the user's avatar moves during this process, however, the hands (or other reference point) remain fixed with respect to the avatar.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of

Having thus described various embodiments of the invention, what is claimed as new and desired to be protected by Letters Patent includes the following:

1. A system for virtual reality, comprising:
   a head-mounted three-dimensional display wearable by a user;
   a processor; and
   one or more computer-readable storage media storing computer-executable instructions which, when executed by the processor, perform a method of generating images for display on the head-mounted, three-dimensional display, comprising the steps of:
   generating a series of base images of three-dimensional imagery;
   measuring relative movement of a virtual object in the series of base images,
   wherein the step of measuring relative movement of the virtual object is performed by detecting collision of the virtual object with an extended body of a virtual representation of the user;
   determining, based on the relative movement of the virtual object, that the series of base images includes a high degree of peripheral optic flow;
   applying a blinder to a side of the series of base images associated with the high degree of peripheral optic flow to obtain a series of blindered images; and
   displaying the series of blindered images on the head-mounted, three-dimensional display.

2. The system of claim 1, wherein the high degree of peripheral optic flow results from a head movement of the user.

3. The system of claim 1,
   wherein the head-mounted display includes stereo speakers, and
   wherein the method further comprises the step of providing a directional audio cue in response to determining the high degree of peripheral optic flow.

4. The system of claim 1, wherein the blinder includes a parabolic interior boundary.

5. The system of claim 4, further comprising the step of adding noise to the parabolic interior boundary of the blinder.

6. The system of claim 1, further comprising a step of superimposing a point of reference fixed with respect to a virtual representation of the user on the series of base images.

7. The system of claim 1, wherein method further comprises the steps of:
   determining that the series of base images includes an additional high degree of peripheral optic flow associated with an additional side of the series of base images; and
   applying an additional blinder to the additional side of the series of base images.

8. A virtual-reality display for mounting on a head of a user, comprising:
   a first display configured to be positioned in front of a left eye of the user;
   a second display, configured to be mounted in front of a right eye of the user;
   a plurality of speakers, configured to provide stereo sound to the user;
   one or more sensors configured to track an orientation for the head of the user;
   a processor; and
   one or more computer-readable media storing computer-executable instructions that, when executed by the processor, perform a method of dynamically applying blinders to virtual-reality imagery comprising the steps of:
   receiving, from the one or more sensors, an indication of a rotation of the head of the user to a new orientation;
   updating a left eyepoint and a right eyepoint in a virtual scene to correspond to the new orientation,
   wherein the left eyepoint and the right eyepoint are updated in real time with no inertia;
   determining that, as a result of updating the eyepoint, the virtual scene includes high peripheral optic flow at a first border;
   applying blinders to the first border of the virtual-reality imagery on the first display and the second display to reduce the high peripheral optic flow at the first border;
   determining that, as a result of updating the eyepoint, the virtual scene includes additional high peripheral optic flow at a second border; and
   applying blinders to the second border of the virtual-reality imagery on the first display and the second display to reduce the additional high peripheral optic flow at the second border.

9. The display of claim 8, wherein the method further comprises the step of proving a directional audio cue corresponding to the new orientation.

10. The display of claim 8, wherein the each of the blinders includes an interior parabolic boundary.

11. The display of claim 10, wherein the interior parabolic boundary of each of the blinders includes animated noise.

12. The display of claim 8, wherein the method further comprises the step of superimposing a fixed reference point on the left display and the right display.

13. A method of dynamically applying blinders to a three-dimensional image, comprising the steps of:
   receiving a series of base images of three-dimensional imagery;
   measuring relative movement of a virtual object in the series of base images;
   determining, based on the relative movement of the virtual object, that the series of base images includes a high degree of peripheral optic flow associated with a side of the series of base images;
   applying a blinder to the side of the series of base images associated with the high degree of peripheral optic flow to obtain a series of blindered images;
   determining that the series of base images includes an additional high degree of peripheral optic flow associated with an additional side of the series of base images; and
   applying an additional blinder to the additional side of the series of blindered images; and
   displaying the series of blindered images on a display mounted on a head of a user.

14. The method of claim 13, wherein the blinder includes a parabolic interior boundary.

15. The method of claim 14, wherein the parabolic interior boundary includes animated noise.

16. The method of claim 13, further comprising the step of providing a directional audio cue corresponding to the relative movement of the virtual object.

17. The method of claim 13, further comprising the step of superimposing a fixed reference point on the series of blindered images.

18. The method of claim 13, wherein the relative movement of the virtual object results from a movement of the head of the user.

19. The method of claim 13, further comprising the steps of:
   determining that the series of blindered images includes a high degree of optic flow; and
   completely blanking the series of blindered images.

20. The method of claim 13, wherein the step of measuring relative movement of the virtual object is performed by detecting collision of the virtual object with an extended body of a virtual representation of the user.

\* \* \* \* \*